UNITED STATES PATENT OFFICE.

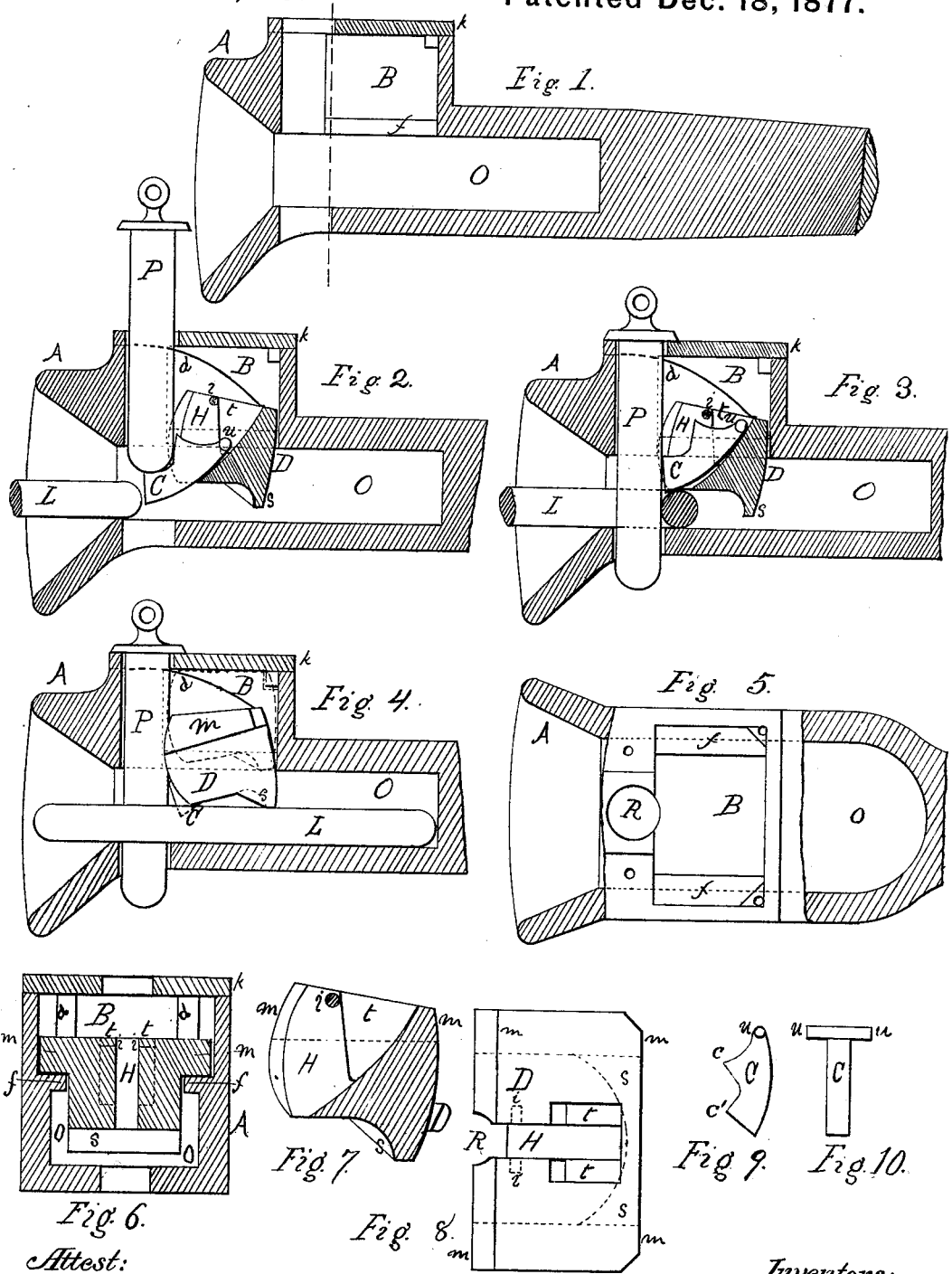

HOLLAND N. STEVENSON, OF CAMBRIDGE, NEW YORK, AND HENRY C. SWAN, OF WASHINGTON, DISTRICT OF COLUMBIA.

IMPROVEMENT IN CAR-COUPLINGS.

Specification forming part of Letters Patent No. 198,318, dated December 18, 1877; application filed November 28, 1877.

*To all whom it may concern:*

Be it known that we, HOLLAND N. STEVENSON, of Cambridge, in the county of Washington and State of New York, and HENRY C. SWAN, of the city and county of Washington, and District of Columbia, have invented a new and useful Improvement in Car-Couplings, of which the following is a specification:

The object of this invention is to provide an automatic coupling in which the pin can be set and held in an upright position, whether the link be in or out of the draw-head, and in which the withdrawal of the link does not interfere with the setting of the pin; also, to provide a sufficiently firm abutment against the end of the link to insure coupling with the opposite draw-head, and, at the same time, one that will yield should an undue pressure be made on the link, so as to endanger its safety; also, to hold the link in a nearly horizontal position, to assist it in making an entry into the opposite draw-head; and also to improve the coupling patented January 30, 1872, and numbered 123,207.

In the drawings, Figure 1 represents a longitudinal vertical section of the draw-head; Figs. 2, 3, and 4, similar sections, showing the actuating parts in various positions. Fig. 5 is a plan view of Fig. 1 with its plate removed. Fig. 6 is a transverse sectional view of the draw-head and the actuating parts; and Figs. 7, 8, 9, and 10 are sectional and detailed views of the actuating parts.

A represents the draw-head; B, a chamber in the draw-head to contain some of the actuating parts. C is a sliding dog, and D is a movable and yielding abutment working in chamber B of the draw-head, and when in place the flanges $m\ m$ rest upon seats $f\ f$ in chamber B, as seen in Fig. 6. This movable abutment D carries the sliding dog C in chamber H, is rounded upon its rear face to easily turn or oscillate in the chamber, and bear against the rear wall of said chamber B without hinderance, while its front face is also rounded and can bear against the front wall of chamber B, so that in oscillating it will be free to rise or fall at any time, and when the force that causes oscillation is removed it will resume its normal position by gravitation, as seen in Fig. 6. Chamber B is open at its top, into which the oscillating abutment-block D is inserted, with its sliding dog C, when a cover, $k$, is permanently secured to the draw-head, completely covering the opening into chamber B.

The lower part of the block D, forward of lip $s$, is cut or hollowed out, so as to allow a free entry of the link under it, but exerts its weight on the rear end, when the front end is slightly drooped, thus holding the link nearly in horizontal position, and in position for a fair entry into the opposite draw-head.

Other devices than the dog C may be used in block D for holding the pin P in position for coupling without departing from the principle as above described; but we prefer the construction as set forth and shown.

The sliding dog C is curved on its rear side, which may slide on the inclined plane at the back of chamber H, in block D, in its reciprocations, and projecting from each side and at the top end of the dog are trunnions $u\ u$, that work in the trunnion seats or guides $t\ t$, while the dog is prevented from being at any time forced too high by the pin $i$, that is placed transversely across the front opening of chamber H, so that the enlarged part $c$ of the dog C may strike against the pin, when a further rise is prevented. The dog is also prevented from dropping too low by the trunnions $u$, resting in the bottom of seats $t$, which also serve to guide the dog in its upward oscillating backward sliding movement. P is an ordinary coupling-pin, and L an ordinary coupling-link.

A portion of the pin-hole R opens into chamber B, and a portion or part of the opening for the pin is made in the forward face of block D, in order to have the pin P in better position to stand upright on the lower part of the dog C when in position for coupling.

The vertical opening in chamber H in the abutment-block is of sufficient width to allow the forward part of the sliding dog to enter any part of it.

A car-coupler constructed as above described will operate as follows in coupling: When the pin P is raised to the proper height, the dog C slides down and forward by its own gravity, so that its lower end $c'$ will be in nearly a horizontal position, and project in the pathway of the pin, catch and hold the pin in position for coupling as it rests upon the lower part of the dog, as seen in Fig. 2, and is so held by the trunnions $u$, resting in their seats $t$, from dropping too low. This position of the dog C and pin P is maintained until the link L is forced into the mouth of the draw-head and strikes the dog, forcing it back and upward into chamber H, as seen in Fig. 3, when the link will pass under it, and as it so passes the pin will fall through the opening of the link into the hole in the lower part of the draw-head, and the coupling is completed.

To uncouple two cars it is only necessary to raise pin P high enough, when the inclined rear side of chamber H will cause the lower end of dog C, in sliding down, to pass over the rear end of and into the opening of the link, with the pin resting upon it. The link is then free to pass out of the draw-head. In so doing the link carries the bottom of the dog forward by partially rotating it, raising the lower end thereof and the pin with it, and the cars are uncoupled, while the pin P and dog C are still in the position seen in Fig. 2, and ready for coupling again.

In coupling it is sometimes the case that the link is forced into the draw-head with too much force, and if it struck a solid or unyielding abutment, the link would be broken or bent out of shape, while in this coupling the oscillating block D, as the link passes under its forward portion, where it is cut away, until it strikes against the curved lip $s$ at the rear side of the block, causing the block to rise at the rear side, guided by the rear wall of chamber B against the weight of the block and the force of springs $d$ until the link L has passed into chamber O of the draw-head, or until the buffer-ends of the draw-heads meet, when the springs $d$ assist the gravitation of the block to return to its place on rests $f$, when the position of the abutting-block, link, dog, and pin will be as seen in Fig. 4; and when the link is again drawn forward the actuating parts will assume the position as seen in Fig. 3.

As the draw-heads of different cars are not always of the same height above the rail, the effect of forcing the link against the sliding dog, whether it enters the mouth of the draw-head at the top or bottom of chamber O, will be the same upon block D, dog C, and pin P, and a coupling is sure to be effected, as the curved forward face of block D, when the link strikes it, will be sure to raise the block, dog, and pin, so that the dog is at the top of chamber B, as seen in Fig. 4 in dotted lines, and in whatever position the block D may be in, by raising the pin high enough, the dog C will surely slide down and forward, so that its lower end will be under and sustain the pin, whether for coupling or uncoupling.

Having thus described our invention, what we claim is—

1. The sliding dog C, provided with trunnions $u\ u$, working in seats $t\ t$ in chamber H, of the oscillating and yielding abutment-block D, substantially as described.

2. The sliding and oscillating abutment block D, having its front and rear faces convex, and its rear lower or under side provided with lip $s$, as and for the purposes described.

3. The sliding and oscillating abutment-block D, provided with chamber H and flanges $m$, in combination with the sliding dog C, substantially as and for the purposes described.

4. The sliding and oscillating abutment-block D, provided with chamber H and stop-pin $i$, in combination with the sliding dog C, substantially as described.

5. The abutment-block D, provided with the convex front and rear sides, and supporting-flanges $m\ m$, in combination with the rests $f\ f$ in chamber B, of draw-head A, as described.

6. In an automatic car-coupling device, the combination of the draw-heads A, containing chambers B and O, the sliding and oscillating block D, provided with chamber H, and sliding gravitating dog C, the link L, and pin P, all constructed and operating substantially as described.

7. The combination of the abutting block D with the spring $d$, as and for the purposes described.

HOLLAND N. STEVENSON.
HENRY C. SWAN.

Witnesses:
J. MASON GOSZLER,
F. H. SCHOTT.